Dec. 9, 1941.　　P. A. KINZIE ET AL　　2,265,175
GATE VALVE
Filed Oct. 29, 1937　　10 Sheets-Sheet 1
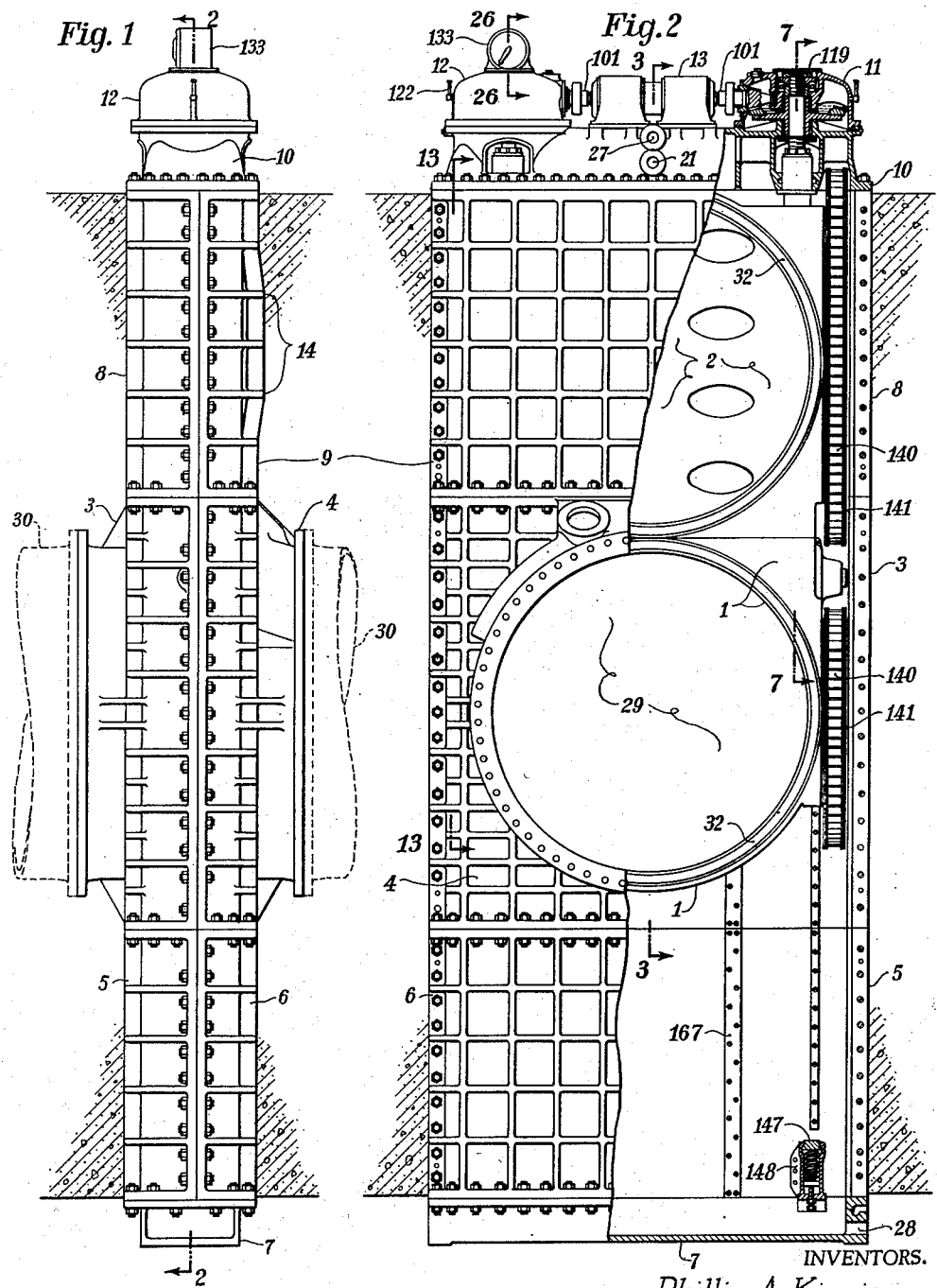
INVENTORS.
Phillip A. Kinzie
Grover J. Hornsby
BY
ATTORNEY.

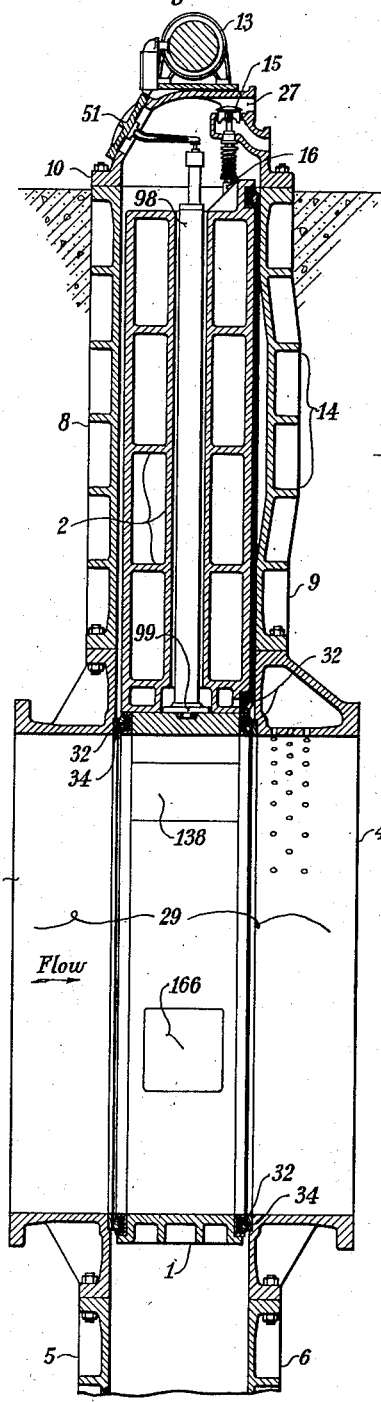
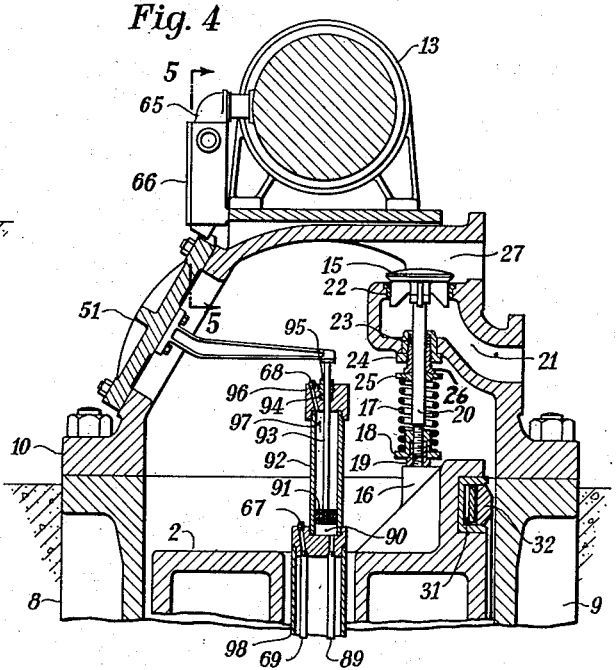
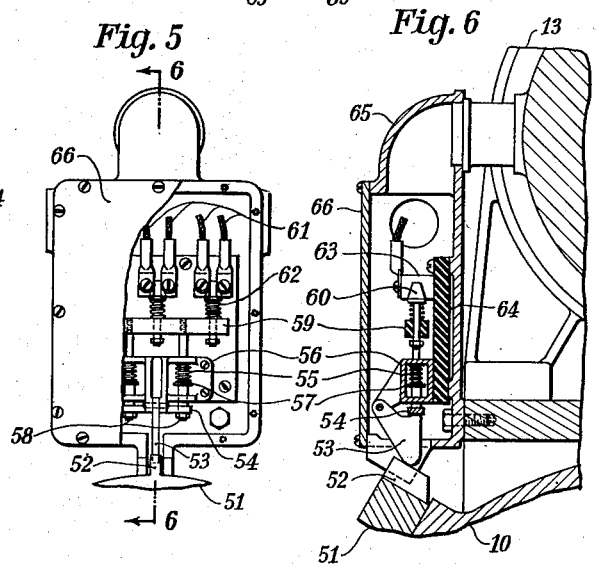

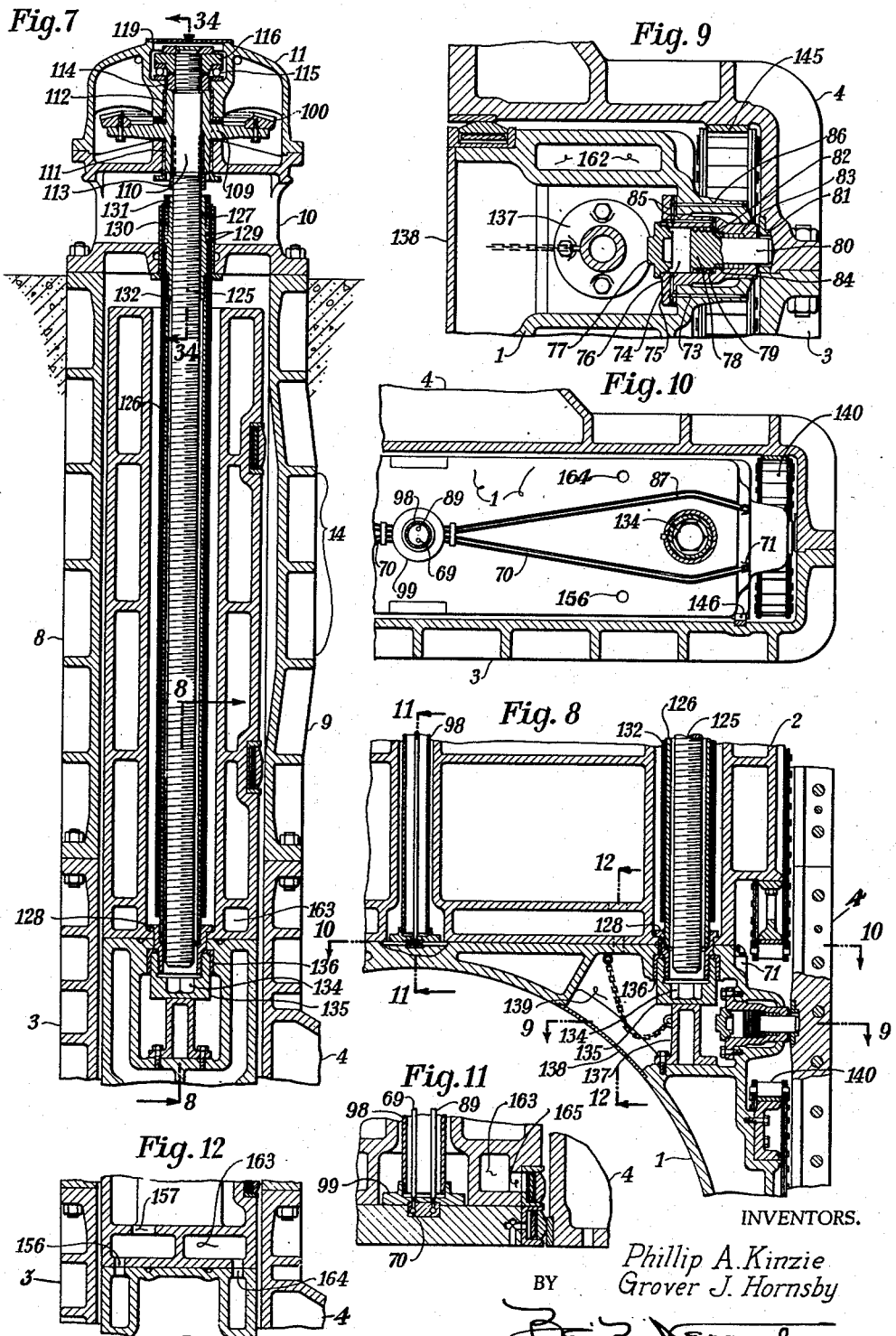

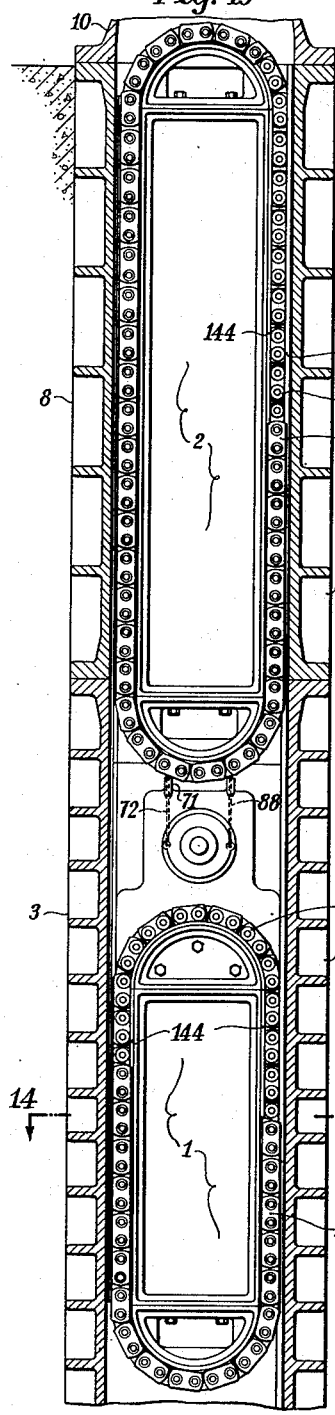
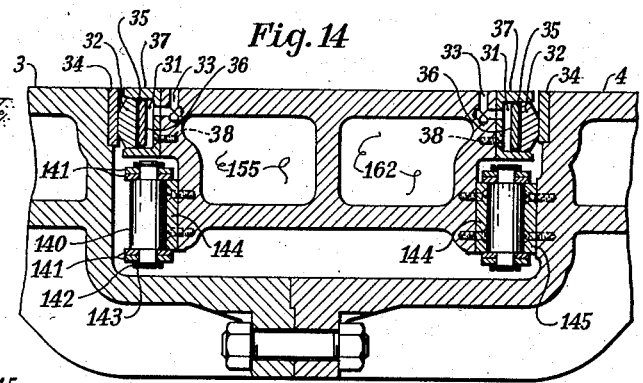
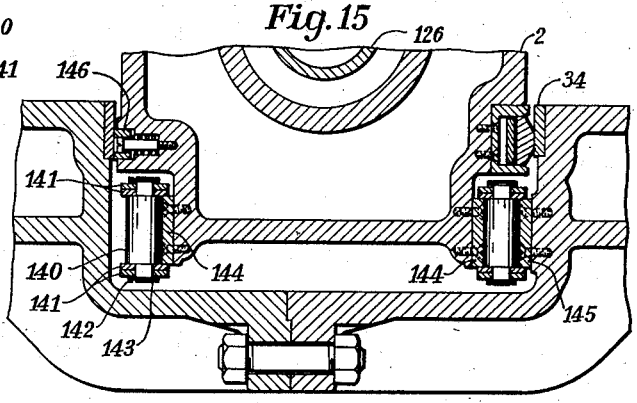
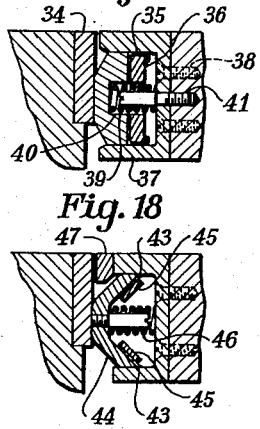
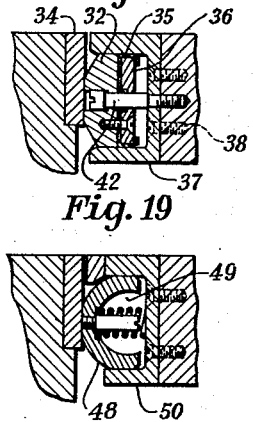
INVENTORS.
Phillip A. Kinzie
Grover J. Hornsby
BY
ATTORNEY.

Dec. 9, 1941.                P. A. KINZIE ET AL                2,265,175
                                 GATE VALVE
                            Filed Oct. 29, 1937              10 Sheets-Sheet 5

INVENTORS.
Phillip A. Kinzie
Grover J. Hornsby
BY
ATTORNEY.

Dec. 9, 1941.    P. A. KINZIE ET AL    2,265,175
GATE VALVE
Filed Oct. 29, 1937    10 Sheets-Sheet 6
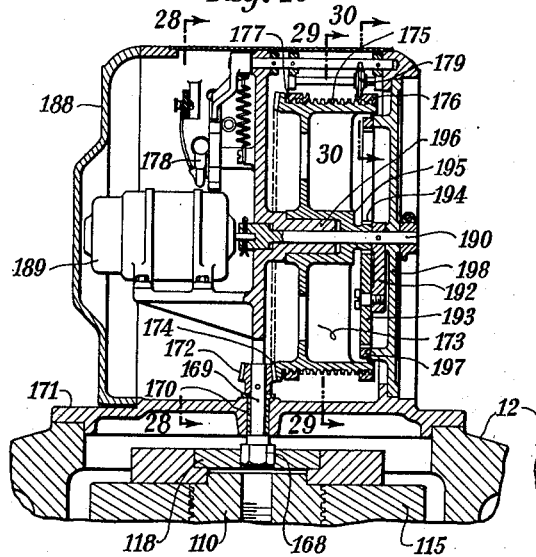
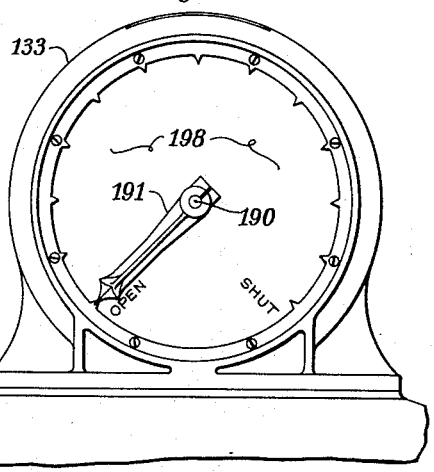
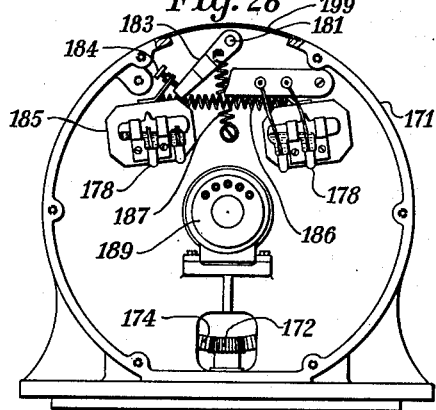
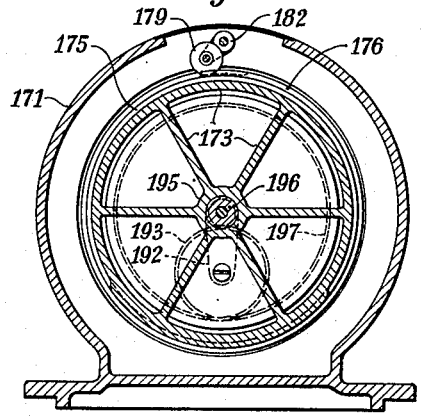
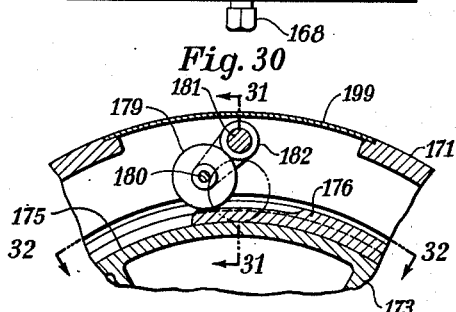
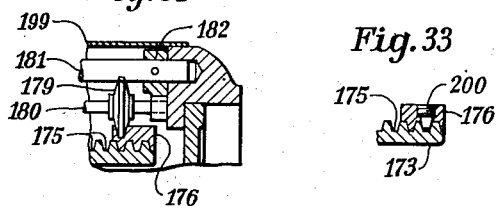
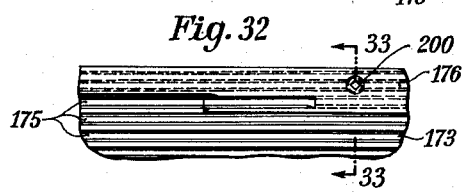
INVENTORS.
Phillip A. Kinzie
Grover J. Hornsby
BY
ATTORNEY.

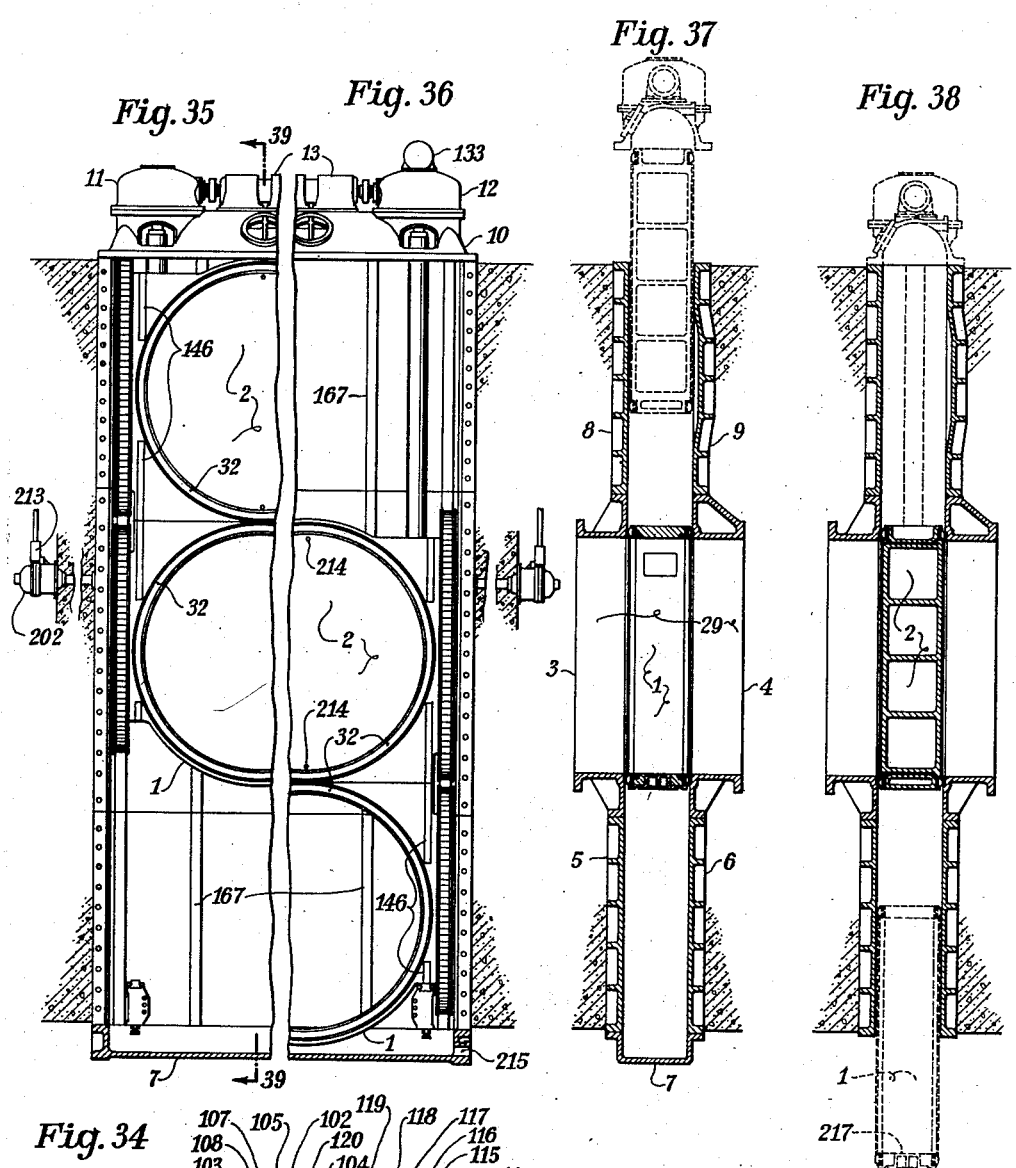
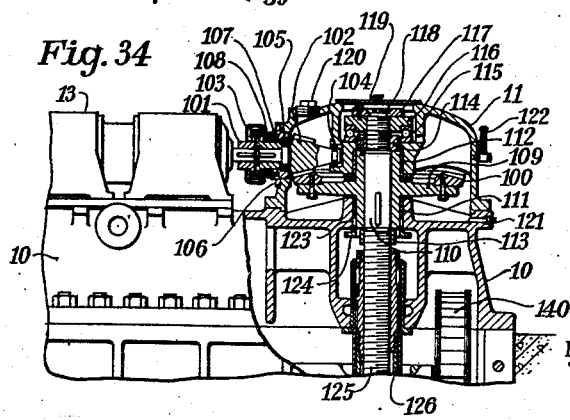

Dec. 9, 1941.  P. A. KINZIE ET AL  2,265,175
GATE VALVE
Filed Oct. 29, 1937  10 Sheets-Sheet 8
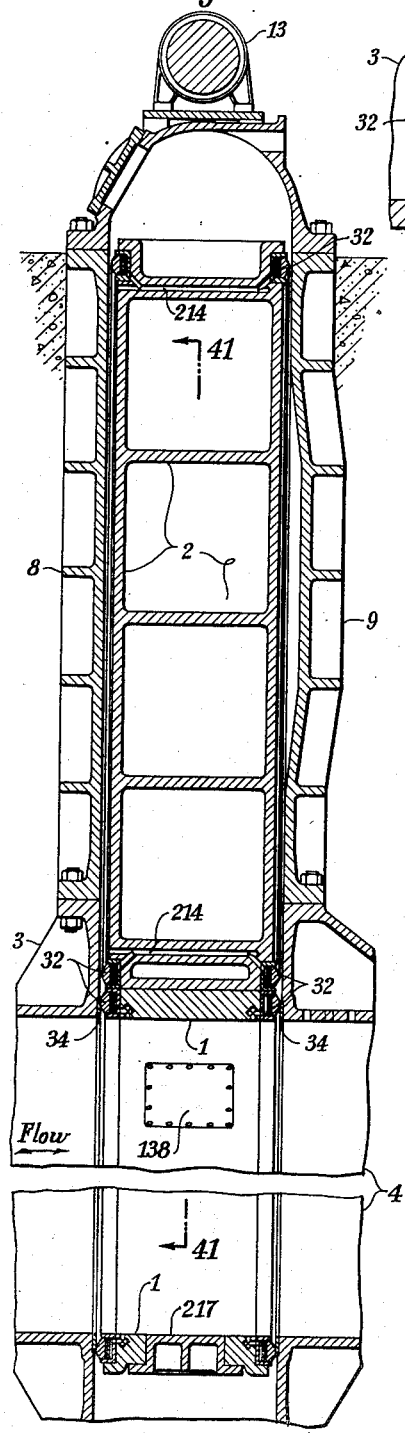
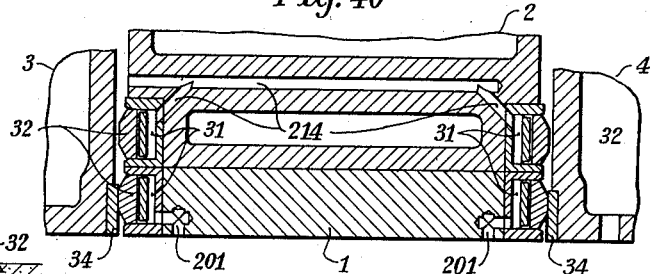
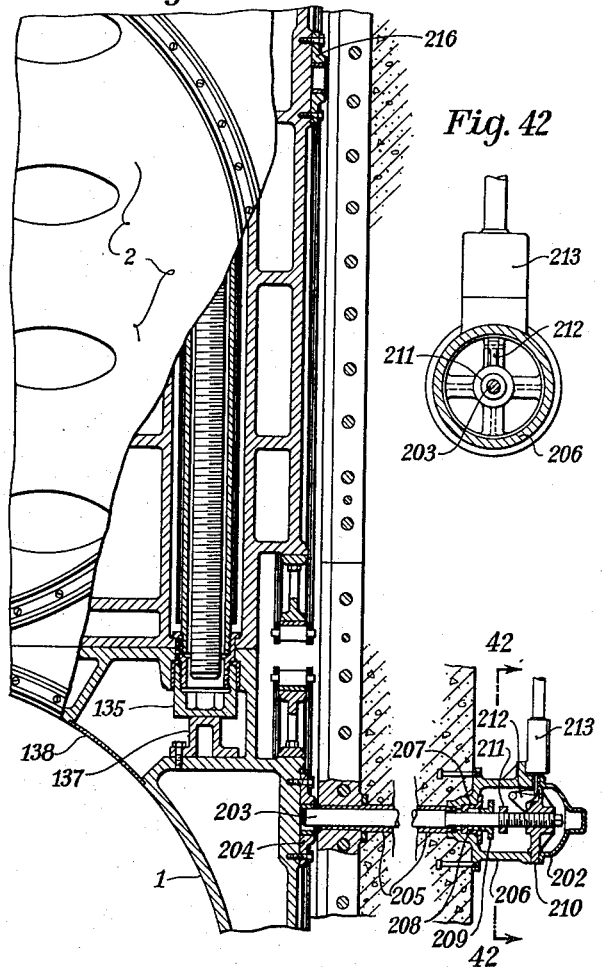
INVENTORS.
Phillip A. Kinzie
Grover J. Hornsby
BY
ATTORNEY.

Dec. 9, 1941.    P. A. KINZIE ET AL    2,265,175
GATE VALVE
Filed Oct. 29, 1937    10 Sheets-Sheet 9
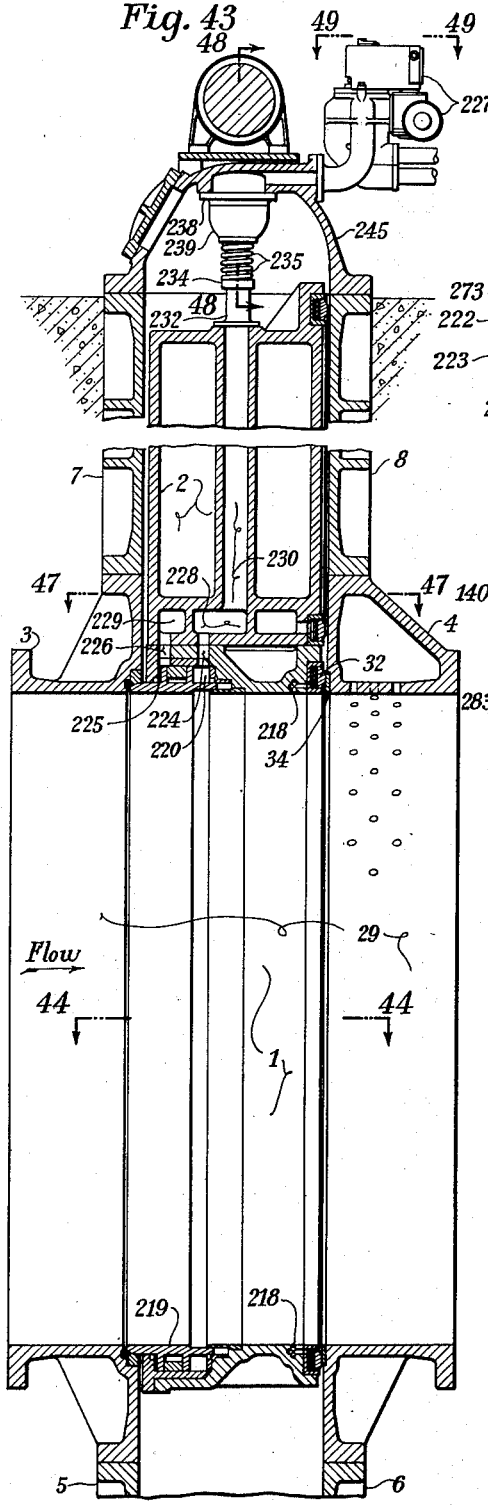
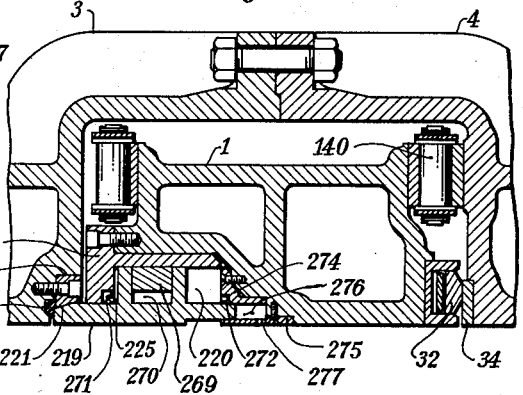
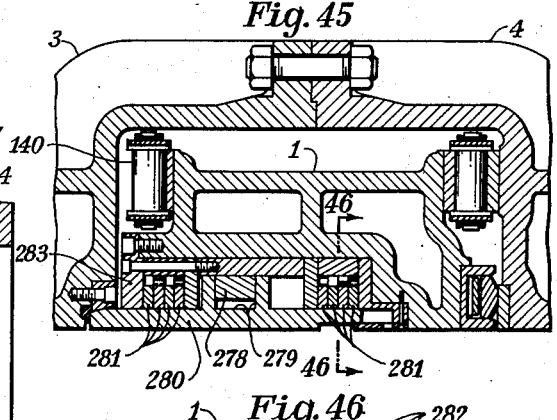
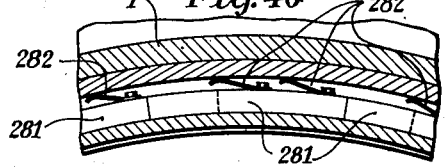
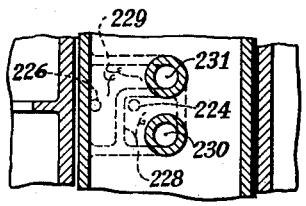
INVENTORS.
Phillip A. Kinzie
Grover J. Hornsby
BY
ATTORNEY.

Dec. 9, 1941.  P. A. KINZIE ET AL  2,265,175
GATE VALVE
Filed Oct. 29, 1937  10 Sheets-Sheet 10

INVENTORS.
Phillip A. Kinzie
Grover J. Hornsby
BY
ATTORNEY.

Patented Dec. 9, 1941

2,265,175

UNITED STATES PATENT OFFICE

2,265,175

GATE VALVE

Phillip A. Kinzie and Grover J. Hornsby, Denver, Colo., assignors to Universal Hydraulic Corporation, Denver, Colo., a corporation of Colorado Application October 29, 1937, Serial No. 171,656

20 Claims. (Cl. 251—59)

In general, this application relates to improvements in gates which have, within an encasing housing, a roller-mounted leaf or closure member, and which are raised or lowered vertically by a hoisting means mounted integral with, and forming a part of the encasing housing. About midway between the top and bottom, the structure has a fluidway through the encasing housing to which the penstock, conduit, or other fluid carrying element may be attached. The roller-mounted gate leaf within the encasing housing, too, has a fluidway, coinciding with that of the housing, through one portion, and has also an adjacent bulkhead portion for interrupting the fluid flow. It is by the proper positioning of the gate leaf, within the encasing housing, in relationship to the fluidway, that passage or stoppage of fluid is accomplished.

In particular, our invention relates to a method for arranging the elements of a roller-mounted gate so that movable elements thereof may be removed for inspection or repairs while the gate is in service, that is without necessitating the draining of fluid from the penstock, conduit, or connecting fluid carrying element.

The economic and practical value of the invention in the case of a power plant penstock installation can well be readily appreciated when one realizes that major inspection, maintenance, or repairs can be made upon the gate without necessitating the shutting down of a turbine with the attendant loss of power and revenue. A valve of this type, while particularly well adapted for use in power plant installations, is by no means limited to this particular field of service; for it can be as readily applied to irrigation conduits, domestic water lines, oil lines, gas lines, and other fluids with as effective and salutary results.

Whereas in the design depicting our invention we have shown a circular fluidway it is obvious that the design is readily adaptable to any shape of fluidway. It will also be apparent that the location of the fluidway through the encasing housing could be altered without departing from the spirit of the invention; that is closure of the fluidway could be as readily accomplished by reversing the position of the fluidway and bulkhead portions of the leaf, and by having the leaf raise to effect closure instead of lower as is depicted; or with slight modifications the operation could be made horizontal. Another feature, the hoisting means, obviously, could be changed to employ a single stem with either a mechanical or hydraulic hoist. The method of hoisting shown, using the dual internal stems, has been disclosed in principle in an application cited later herein; however, improvements and modifications expedient to this design have been added. We mention these factors briefly in order that the innate flexibility of the invention will be readily appreciated.

Another desirable feature of the invention which is not immediately apparent is its compactness which results in economies in both the gate itself and the installation thereof. In order that these factors may be more readily apparent these comparative data are cited for a 102" gate as depicted in the invention and a 102" prototype: Overall height, 31' 8½" as against 42' 9" for the prototype, embedded height, 27', 5¼" as against 30' 5¾" for the prototype, and operating chamber height, 15' 7" as against 20' 0" for the prototype. In connection with the saving in height of the operating chamber, the economic value will be apparent when one considers that in the installation of the gate within a dam, owing to the great compressive stresses within the mass of concrete, large operating chambers are objectionable since they produce a discontinuity in the flow of stress through the concrete and require much carefully placed and expensive reinforcing steel to offset the concentration of stresses around the chamber. Another economic factor is the difference in weight of the invention as against the prototype: invention 166,750 pounds as against 187,800 pounds for the prototype. Too, much of this saving in weight is on the more expensive non-corrodible metals, such as bronze and stainless steel.

The following enumeration of the objectives define more specifically the nature and purpose of our invention:

Our invention has an object, a fluid interrupting means, comprising an encasing housing, a fluid interrupting member, and a hoisting unit mounted integral with the encasing housing and adapted to raise or lower the encased fluid interrupting member, said means to be of such disposition and construction as to allow inspection of the movable parts while fluid is passing through the fluidway.

Our invention has an object, the ability to remove a section of the leaf or closure member, while the gate is in use with fluid passing therethrough, by providing an articulated construction of said leaf or closure member.

Our invention has an object, a means whereby an articulated gate leaf or closure member can be disjointed while fluid is passing through the fluidway; said means to comprise a part of the hoisting elements for said leaf.

Our invention has as an object, a hydraulically actuated means for suspending, independently of the hoisting stems, one element of a articulated leaf, so that the hoisting means and second element of the leaf can be removed for inspection or repairs while fluid is passing through the suspended element.

Our invention has as an object, an independent set of roller trains on each element of an articulated leaf or closure member, so that each element forms a complete and integral unit.

Our invention has as an object, a means comprising an integral part of the hoisting elements for joining and alignig the elemets of an articulated leaf or closure member.

Our invention has as an object, a hydraulic means for actuating the movable sealing elements contained in both elements of the articulated leaf or closure member.

Our invention has an object, a means whereby the controlled fluid actuates the seals, on the fluidway element of an articulated closure member, through passageways directly communicating with the fluid passageway, and integral with the fluidway element of said closure member.

Our invention has as an object, a means whereby the controlled fluid actuates the seal on the bulkhead element of the closure member, through passageways integral with the closure member, and by an automatically actuated valve mounted on the closure member and immersed in the controlled fluid.

Our invention has as an object, hydraulic sealing means mounted integral on the leaf or closure member and on the passage forming or follower member, said means to be forced outward automatically when the gate reaches the extremes of its travel.

Our invention has an object, the arrangement of sealing the fluidway passing through the leaf or closure member and encasing housing by means of hydraulically actuated seals adapted to move parallel with the direction of flow; said seals and their respective seats to be set substantially parallel to each other and to the plane of vertical travel of the gate leaf.

Our invention has as an object, an arrangement of the elements comprising the hoisting means, which will permit individual inspection or repairs on either or both stem gear cases without necessitating removal of the prime actuating means, or which will permit removal of the prime actuating means without disassembling the stem gear cases.

Our invention has as an object, a controlling means for limiting the upper and lower travel of the leaf or closure member; said means to be actuated by the rotation of a gate stem and by appropriate mechanism stop the prime mover or motor when the requisite number of turns have been made by the stem.

Our invention has as an object, a novel arrangement of the elements comprising a limit switch wherein the total travel of the leaf in units is reproduced by the same number of units on a circular drum, a fact which permits extreme accuracy in determining the limits of travel of the leaf and permits a corresponding degree of accuracy in setting the trips for breaking an electrical circuit to stop the motor.

Our invention has as an object, a device for limiting the travel of a closure member, which, in addition, will give the position of the gate directly, and also will transmit the position electrically for remote indication.

Our invention has as an object, the arrangement of dual seals in both the bulkhead and fluidway elements of an articulated gate leaf, and an external mechanical means for suspending either element of the gate leaf independently of the hoisting stems in order that either element may be removed for inspection or repairs without withdrawing the fluid from the connected fluid carrying elements.

Our invention has as an object, a means for actuating the dual sealing means of both the bulkhead and fluidway elements of a gate leaf; said means to comprise passageways, directly communicating with the controlled fluid, and integrally disposed with regard to the particular element of the gate whose seals are actuated through them.

Our invention has as an object, the arrangement of dual sealing means on the fluidway element of an articulated gate leaf; wherein one element of said sealing means not only seals, but also suspends the element of the leaf in which it is contained.

Our invention has as an object, a means for suspending a gate leaf independently of the hoisting elements; said means to comprise a cylindrical element, hydraulically actuated, and integrally contained within the structure of the gate leaf.

Our invention has as an object, a means for hydraulically actuating a cylindrical sealing and suspending element within a gate leaf by an external control valve; said valve to be in communication by flexible means with the annular actuating ports for the cylindrical sealing and suspending element when the fluidway element of the leaf coincides with the fluidway through the encasing members.

Our invention has as an object, the means, for electrically interlocking the actuating and controlling elements for an articulated leaf within an encasing housing, whereby the hazard of malfunctioning is reduced to the mechanical minimum.

Our invention has as an object, a simplicity and compactness of the elements comprising an articulated fluid interrupting means, whereby less installation space will be required and less weight of gate will be necessary with the resulting economies accruing therefrom.

In conclusion, our invention has as an object, a fluid interrupting means, comprising an articulated leaf or closure element operated normal to axial fluid flow within an encasing housing by a hoisting means mounted integral with said housing, which will be readily accessible for repairs and inspection, readily adaptable for installations requiring special operating conditions, and so controlled that it will be safe and reliable in operation.

With the foregoing objects in view and for the purpose of satisfying the patent statutes, there will now be described the specific embodiments of the invention which has been illustrated in the accompanying drawings, forming a part hereof, and wherein:

Fig. 1 is a side elevation;

Fig. 2 is partially a downstream elevation and partially a section taken on the plane 2—2 of Fig. 1;

Fig. 3 is a section taken on the plane 3—3 of Fig. 2;

Fig. 4 is an enlargement of the upper portion of Fig. 3;

Fig. 5 is a partial section taken on the plane 5—5 of Fig. 4;

Fig. 6 is a section taken on the plane 6—6 of Fig. 5;

Fig. 7 is a section taken on the plane 7—7 of Fig. 2;

Fig. 8 is a section taken on the plane 8—8 of Fig. 7;

Fig. 9 is a section taken on the plane 9—9 of Fig. 8;

Fig. 10 is a section taken on the plane 10—10 of Fig. 8;

Fig. 11 is a section taken on the plane 11—11 of Fig. 8;

Fig. 12 is a section taken on the plane 12—12 of Fig. 8;

Fig. 13 is a section taken on the plane 13—13 of Fig. 2;

Fig. 14 is a section taken on the plane 14—14 of Fig. 13;

Fig. 15 is a section similar to Fig. 14, but with the leaf in the lowered or closed position;

Fig. 16 is a fragmentary section showing a method for arranging springs behind the seal;

Fig. 17 is a fragmentary section showing a method for retaining the seal ring;

Fig. 18 is a fragmentary section showing an alternate seal and arrangement;

Fig. 19 is a fragmentary section showing a second modification of the seal;

Fig. 26 is a section taken on the plane 26—26 of Fig. 2;

Fig. 27 is an elevation of Fig. 26;

Fig. 28 is a section taken on the plane 28—28 of Fig. 26;

Fig. 29 is a section taken on the plane 29—29 of Fig. 26;

Fig. 30 is a section taken on the plane 30—30 of Fig. 26;

Fig. 31 is a section taken on the plane 31—31 of Fig. 30;

Fig. 32 is a view taken on the plane 32—32 of Fig. 30;

Fig. 33 is a section taken on the plane 33—33 of Fig. 32;

Fig. 34 is a partial section through the hoist taken on the plane 34—34 of Fig. 7;

Fig. 35 is a partial and sectional upstream elevation of the gate structure with the gate raised or opened;

Fig. 36 is a partial and sectional upstream elevation of the gate structure with the gate closed or lowered;

Fig. 37 is a sectional elevation showing the elements which may be removed with the gate in the open position;

Fig. 38 is a sectional elevation showing the elements which may be removed with the gate in the closed position;

Fig. 39 is a section taken on the plane 39—39 of Fig. 35 and shows an alternate arrangement of seals;

Fig. 40 is an enlarged fragment of Fig. 39 adjacent to the upper portion of the fluidway;

Fig. 41 is a section taken on the plane 41—41 of Fig. 39;

Fig. 42 is a section taken on the plane 42—42 of Fig. 41;

Fig. 43 is a section which is analogous to Fig. 39 but which shows a second alternate method of arranging the seals;

Fig. 44 is a section taken on the plane 44—44 of Fig. 43;

Fig. 45 is a section analogous to Fig. 44 showing an alternate construction;

Fig. 46 is a section taken on the plane 46—46 of Fig. 45;

Fig. 47 is a section taken on the plane 47—47 of Fig. 43;

Figure 20:
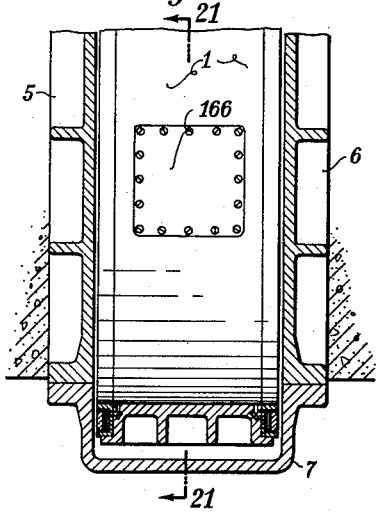
Fig. 20 is a section through the lower portion of the gate structure with the leaf in the closed or lowered position and is taken along a vertical plane parallel to fluid flow.

By reference to the accompanying drawings Figs. 1 and 2, it will be seen that the leaf, which consists of the cylindrical or fluidway element 1 and the bulkhead element 2, is encased by the upstream body member 3, downstream body member 4, lower upstream bonnet member 5, lower downstream bonnet member 6, lower bonnet cover 7, upper upstream bonnet member 8, upper downstream bonnet member 9, and upper bonnet cover 10, on which are mounted the hoist case members 11 and 12 and the motor and gear reduction unit 13. It will be noticed that there is a bulged portion 14 on the upper downstream bonnet member 9 which serves as a pressure equalizing means and is fully described in a prior application filed October 10, 1936, by Phillip A. Kinzie, et al. (Serial number 105,077) on which Patent No. 2,131,053 was granted September 27, 1938.

When the gate leaf is in the raised position—Figs. 2 and 3—the water pressure within the encasing housing members is released due to the raising of the poppet valve 15—Figs. 3 and 4—by the bracket 16 on the bulkhead element 2 of the leaf. The raising of the poppet valve 15, which is contained within the upper bonnet cover 10 and is normally maintained in the closed position through the downward force exerted by the spring 17 on the collars 18 and 19 threaded on the lower termination of the stem 20, allows water to be exhausted through the port 21. The non-corrodible bushing 22 insures proper guiding of the poppet valve, and the packing 23, which is contained within the stuffing box 24 and compressed by the upward reaction of the spring 17 through the collar 25 and the gland 26, prevents leakage when the poppet valve is closed. The passageways 27 and 28—Figs. 2, 3 and 4—it will be assumed are closed by suitable valves.

The raising of this poppet valve causes a differential pressure to exist between that of the fluid passing through the fluidway 29 in the fluidway element 1 of the leaf and the fluidways through the upstream and downstream body members, 3 and 4 to which are attached the penstock or conduit members 30—Fig. 1. It is this differential pressure in conjunction with the fact that fluid pressure is admitted to the area 31 behind the seals 32—Figs. 2, 3 and 14—through the drilled holes 33 that actuates the seals. By inspection of Fig. 14 it will be apparent that, since greater area is subjected to pressure behind the seals 32 than is counterbalanced by pressure on the face of the seals, an outward force will be exerted forcing the seals against the seats 34 in the upstream and downstream body members 3 and 4. The leather packing ring 35—Figs. 14, 16, and 17—which is clamped to the seals 32 by the retainer ring 36, prevents the escape of fluid from behind the seals 32. The seal assembly is retained in the non-corrodible U-shaped ring 37 which is attached to the fluidway element 1 of the leaf by the screws 38. Springs 39—Fig. 16—centered by the counterbore 40 and the pin 41, impart an initial outward thrust on the seal 32 and prevent its becoming cramped within the U-shaped ring 37. The screws 42—Fig. 17—serve to prevent the ring from being forced outward too far by the springs 39.

Fig. 18 shows an alternate construction of the seal, wherein dual leather seals 43 are clamped to the sloping inner face of the seal 44 by the strips 45. This seal also has a spring 46 for imparting an initial outer thrust, but in this case the retaining means is the ring member 47. The seal functions in the same manner as the seal previously described. The second alternate seal construction—Fig. 19—differs from the first two in that no leather sealing strips are used. The sealing at the sides of the semicircular seal 48 is accomplished by making the seal sufficiently flexible so that when fluid pressure is introduced into the space 49 behind the seal 48, a lateral deflection will take place and cause the seal to be self sealing within its containing member 50.

With the gate leaf in the raised position, it is possible to remove the hoisting means, upper bonnet cover 10, and the bulkhead element 2 of the gate leaf. This is accomplished in the following manner: The manhole cover 51—Figs. 3 and 4—is removed giving access to the interior of the housing. The removing of the manhole also breaks all electrical contacts and prevents starting the motor. The lug 52 on the manhole cover 51—Figs. 5 and 6—normally holds the lever 53 in a raised position; however, when the manhole cover 51 is removed, the support is withdrawn from the bar 54 and the springs 55 within the bracket 56 push downward on the collars 57 on the studs 58. This action causes the insulating bar 59, on which the conical shaped contactors 60 are mounted, to lower and break the contact between the pairs of wires 61 which control the motor and speed reducer 13. The springs 62 serve to maintain a pressure and provide flexibility for the conical contactors 60 when they are in the raised position. All of the electrical contacts 63 as well as the bracket 56 are mounted on the insulating panel 64, and are contained within the case 65, which is provided with the inspection cover 66. This unit, which is compact, and carefully placed adjacent to the motor is primarily incorporated to prevent the movement of the gate leaf unless the structure is completely assembled; it constitutes a safety factor.

Now, before the hoist and bulkhead element 2 of the leaf can be removed, the fluidway element 1 of the leaf must be independently supported. This result is accomplished by removing the plugs 67 and 68—Fig. 4—and connecting a high-pressure grease gun in the hole left vacant by the removal of the plug 67. Grease is then forced downward through the pipe 69—Figs. 4, 10 and 11—and outward through the symmetrical pipes 70 to the supporting unit. The pipes 70 terminate in the bosses 71—Figs. 8, 10 and 13—on the fluidway element 1. The grease then passes downward through the drilled hole 72—Fig. 13—into the drilled hole 73—Fig. 9—which communicates with the cylindrical space 74 through the drilled holes 75 in the piston cylinder 76. The grease is tightly retained within the cylindrical space 74 by the cylinder cap 77 and exerts an outward force upon the piston 78, which is sealed with the piston rings 79. Outward movement of the piston 78 causes the pin end 80 thereon to enter the non-corrodible bushing 81 which is set into, and retained in the downstream body member 4—Figs. 8 and 9. The annular space 82 is protected from the intrusion of the fluid by the packing 83 which is retained by the gland 84, around the pin end 80. The grease which is displaced from the annular space 82—Fig. 9—during the outward travel of the piston, is forced out through the drilled holes 85 in the piston cylinder 76 and into the drilled hole 86. It is delivered to the pipe 87—Fig. 10—through the drilled hole 88—Fig. 13—whence it travels upward through the connected pipe 89—Figs. 4, 10, and 11—into the space 90 beneath the plunger 91 in the cylinder 92. Inasmuch as the volume of the space 90 beneath the plunger 91 is calculated to equal the volume of the grease displaced from the annular spaces 82, it will be apparent that when the pistons 78 have reached the outer limits of their travel the plunger 91 will have risen and forced the stem 93 upward, giving an indication that the fluidway element 1 of the leaf is adequately supported and that further disassembly of the gate can safely proceed. The packing 94 and the gland 95 in the cylinder cap 96 render the space 97 above the plunger 91 fluidtight at such times as the unit is immersed in a fluid. The tube 98—Figs. 3, 4, 8, 10 and 11—which is rigidly connected to the fluidway element 1 by the flange 99, supports and protects the pipes 69 and 89 while the bulkhead element 2 of the leaf is removed. To withdraw the piston 78 the reverse of the proceedings just described is followed, that is the grease gun is connected to the hole left vacant by the removal of the plug 68 and grease is forced into the area above the plunger 91 until it has been forced all the way down.

In order that the manner of removing the bulkhead element 2 of the gate leaf while the valve is in the open position may be understood, the process and the elements involved will now be described. The first step in the procedure is to remove the hoisting mechanism. The hoisting mechanism—Figs. 2, 7 and 34—is driven by the motor and gear reduction unit 13 which transmits the actuating torque to the bevel gear 100 through the flexible coupling 101 and the bevel pinion 102. The flexible coupling 101 is protected by the split case 103, and is of a type which permits the flexible connecting element to be removed from its periphery for disjointing the halves, a feature which will permit independent removal of the motor and gear reduction unit 13 or the gearing contained within the hoist case members 11 and 12. The pinion 102—Fig. 34—is straddle-mounted on the roller bearings 104 and 105, which are retained in the hoist case members and the stuffing box 106, respectively. The packing 107 and the gland 108 render the case fluid tight at the junction of the outwardly extending half of the coupling 101 and the stuffing box 106. The bevel gear 108—Figs. 7 and 34—is mounted on the hub 109 which is keyed to the stem 110 for the transmission of torque. The hub is journaled in the bearings 111 and 112 located in the upper bonnet cover 10 and hoist case members 11 or 12 respectively. The stem 110 is locked against vertical movement on the hub 109 by the collars 113 and 114, and is supported on the roller thrust bearing 115 through the threaded adjusting collar 116 which is locked in proper adjustment by the collars 117 and 118. The cover 119 prevents the intrusion of foreign matter in the gear case. The plugs 120 and 121, and the gauge 122 provide a means, respectively, for filling and draining the oil and for indicating its level in the gear case. The packing 123 and the gland 124 render the gear case oil tight at the lower termination of the hub 109. The downwardly extending threaded portion 125 of the stem 110—Fig. 7—is contained within the hoisting tube 126 which has the hoisting nut 127 attached to the upper end and has the flanged hub element 128, which is keyed in the fluidway and bulkhead elements, attached to the lower end. The hoisting nut 127 retains the piston rings 129, packing 130, and the gland 131 which prevent the escape of fluid from within the leaf encasing housing by sealing against the sheath tube 132. Inasmuch as a complete description of the principles and functioning of the internal non-rising stem shown in this application has been disclosed in an application, filed December 28, 1935, by Phillip A. Kinzie, et. al. (Serial number 56,418), on which Patent No. 2,131,051, was granted September 27, 1938, only the necessary modifications and general elements are described herein.

The first thing to be done in removing the hoisting mechanism is to disconnect the flexible couplings 101—Figs. 2 and 34—then remove the cover 119 and the indication and control unit 133 from the hoist case members 11 and 12. Next remove the locking collars 117 and 118 and the adjusting collars 116. The hoist case members can now be removed, and the stems 110 screwed out of the hoist tubes 126. With these operations done the upper bonnet cover 10 is removed. Now in order to remove the bulkhead element 2 of the leaf a long hexagonal bar is inserted down through the hoisting tubes 126 in the space left vacant by the removal of the stems 110. The end of the hexagonal bar would enter the hexagonal socket 134—Figs. 7, 8, and 10—in the cap nut 135, which is threaded on to the flanged hub element 128 of the hoisting tube 126, and permit the nut to be screwed off of the hoisting tube. This will allow the bulkhead element 2 of the leaf to be removed. As a precaution against corrosion the cap nut 135 is journaled in the non-corrodible bushing 136—Figs. 7 and 8. The cap nut is supported by the removable pedestal 137 when the lifting tube is removed. The cover plate 138 seals the space 139 from the fluidway; and in cases when the conduit or penstock is empty, permits access to the cap nut 135 or to the hydraulic supporting mechanism.

May we point out that the ability to remove the nut 135 from the bottom of the flange hub 128 on the hoisting tube 126 without removal of the gate leaf, constitutes a new feature and is not described in the prior application for the non-rising stems. It will also be noted that the flanged hub 128 provides a means for aligning the dual elements of the gate leaf—a second feature not described or claimed in the prior application.

It will be noticed that both the fluidway element 1 and the bulkhead element 2 of the leaf are provided with integral roller train units—Figs. 2 and 13—composed of rollers 140, links 141, and locking washers 142 and 143—Figs. 14 and 15. The roller trains are mounted at the sides of the gate and roll upon the non-corrodible tracks 144, which are attached to the leaf elements and upon the complementary non-corrodible tracks 145 which are attached to the housing members. It will be noticed that the links 141 overlap the edges of the tracks 144 and 145, a fact which allows them to serve as the guiding means for the gate leaf. Each element likewise has the spring loaded bars 146—Figs. 10, 15, 24, 35 and 36—which exert a force upon the leaf elements and keep the leaf upon the tracks 145.

The arrangement of the integral roller trains on each element of the leaf is particularly effective, for it permits easy disassembly as previously described and further provides an accurate guiding means for reassembly.

The manner of actuating the seal 32 on the bulkhead differs somewhat from the manner of actuating the fluidway seals. Assuming the gate leaf to be in the lowered position as shown on Figs. 20 to 24 inclusive the seal actuation takes place in the following manner. As the fluidway element 1 nears the rest bar 147—Figs. 21 and 23—which is retained by the beam 148 and supported by the springs 149, the downwardly extending stem 150 on the spool valve 151 contacts the rest bar 147 and raises the spool valve 151 against the spring 152. This action shuts off the port 153, which normally communicates with the port 154 and with the low pressure area on the downstream side of the leaf through the passageway 155 in the fluidway element 1—Figs. 14 and 24—and the communicating holes 156 and 157—Figs. 10 and 12. Since there is no upstream seal on the bulkhead element 2 of the leaf, when the gate leaf is down, the interior of the gate housing will be under fluid pressure from the conduit or penstock. This pressure is admitted to the port 154 through the hole 158 and the ports 159 in the control valve body 160—Figs. 22 and 23. The screen 161 over the ports 159 prevents the intrusion of foreign matter in the control valve. From the port 154 the pressure fluid is delivered to the passageway 162 in the fluidway element 1—Figs. 9, 14 and 24—whence it goes to the passageway 163—Fig. 12—through the port 164. From the passageway 163 it is delivered to the annular space 31 behind the seal 32 through the port 165—Fig. 11,—and actuates the seal, forcing it outward against the seat 34—Fig. 15—and sealing off the downstream fluidway.

Figure 21:
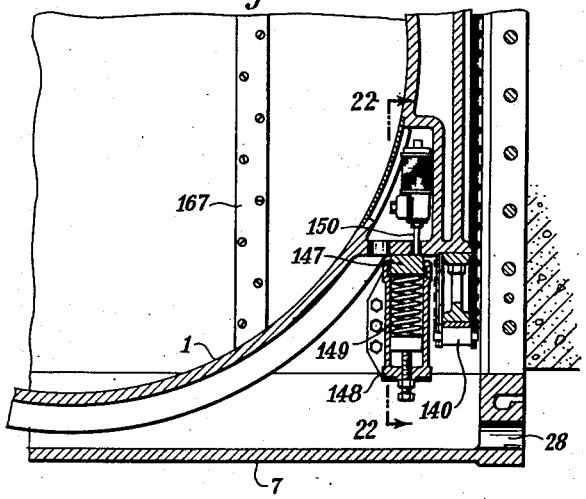
Fig. 21 is a section taken on the plane 21—21 of Fig. 20.
Figure 22:
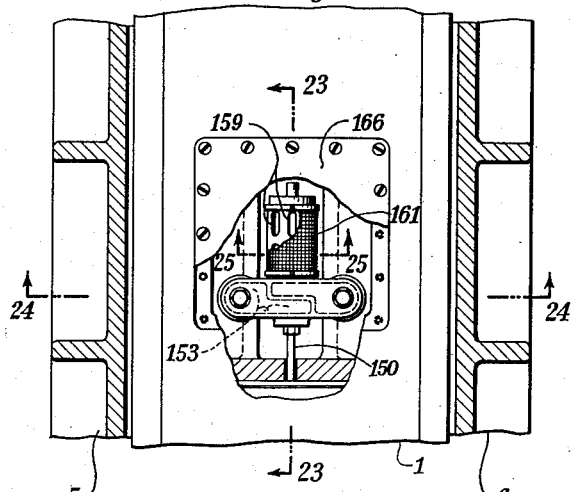
Fig. 22 is a sectional view taken on the plane 22—22 of Fig. 21.
Figure 23:
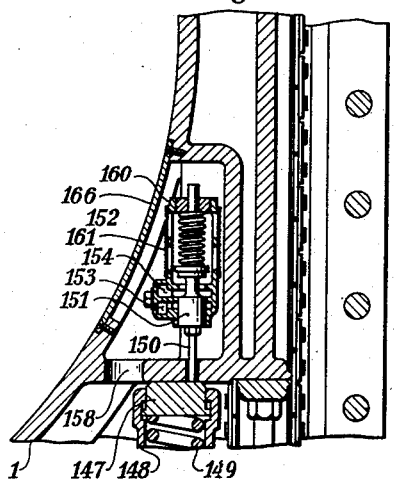
Fig. 23 is a section taken on the plane 23—23 of Fig. 22.
Figure 24:
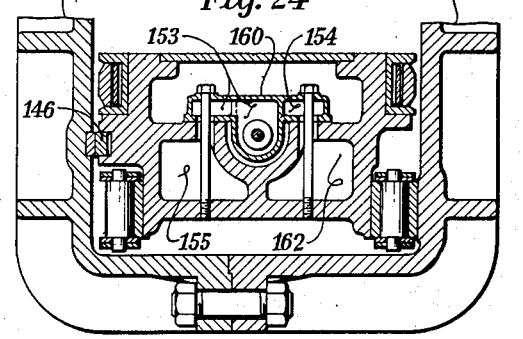
Fig. 24 is a section taken on the plane 24—24 of Fig. 22.
Figure 25:
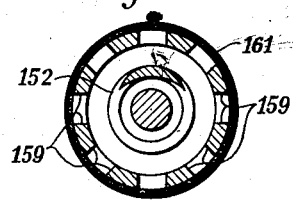
Fig. 25 is a section taken on the plane 25—25 of Fig. 22.
Figure 49:
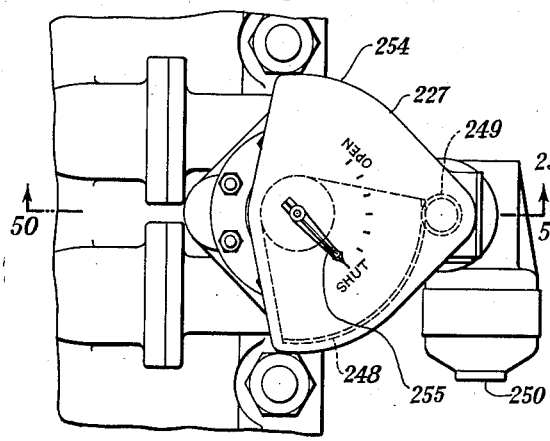
Fig. 49 is a view taken on the plane 49—49 of Fig. 43.
Figure 48:
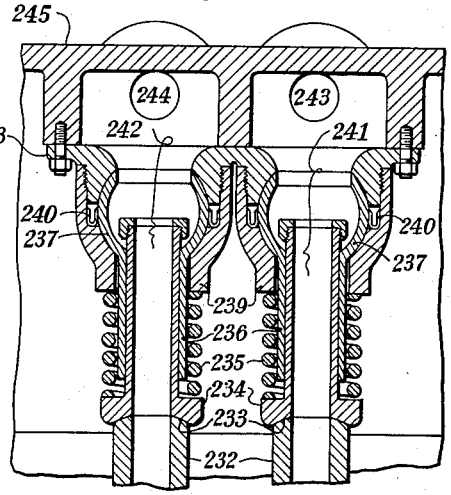
Fig. 48 is a section taken on the plane 48—48 of Fig. 43.
Figure 50:
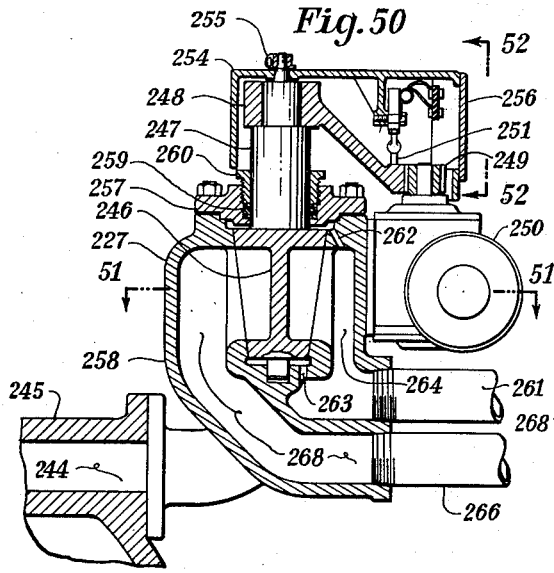
Fig. 50 is a section taken on the plane 50—50 of Fig. 49.
Figure 51:
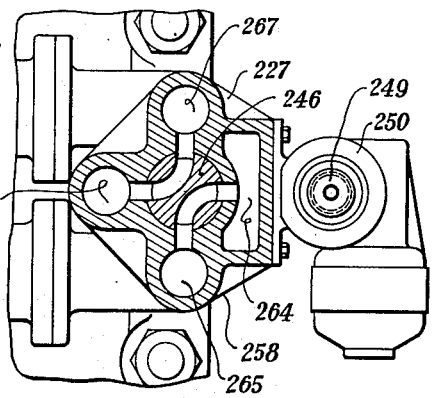
Fig. 51 is a section taken on the plane 51—51 of Fig. 50.
Figure 52:
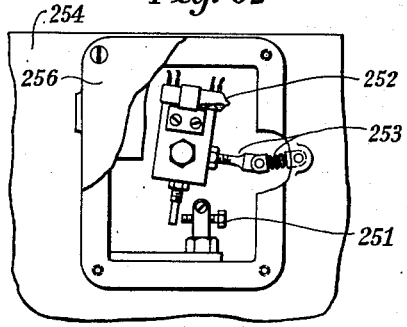
Fig. 52 is a sectional view taken on the plane 52—52 of Fig. 50.

It will be noticed that the control valve body 160 with the contained elements is accessible from the fluidway by removing the cover plate 166—Figs. 20, 22 and 23. This feature permits the valve to be taken out for repairs or inspection by removing the bolts which retain the body 160 on the fluidway element at such times as the leaf is raised and there is no fluid passing through the fluidway 29.

The strips 167—Figs. 2, 21, 35 and 36—are provided as a precaution against the seals 32 being pushed outward too far by the springs 39—Fig. 16—and serve also as a means for sliding the seals 32 on to the seats 34.

A compact and accurate means for controlling the gate travel as well as giving direct indication of the leaf position is provided by the indication and control unit 133—Figs. 1, 2, 26. The unit is actuated by the rotation of the gate stem 110—Fig. 26—through the integrally rotating collar 118 by means of the hexagonal element 168 which enters a mating socket therein. The upwardly extending shaft 169 from the hexagonal element 168 is journaled in the bearing sleeve 170, which is set into the case 171, and has the bevel pinion 172 pinned to its upper end. Rotation is imparted to the cylindrical controlling drum 173 through the integral bevel gear teeth 174 which mesh with the bevel pinion 172. The continuous thread or groove 175 is cut into the periphery of the controlling drum 173—Figs. 26, 29, 30, 31 and 32. Two rings 176 and 177 are screwed on the peripherial thread 175 on the controlling drum 173 and act as cams for tripping the mercury switches 178. The cam roller 179—Figs. 26, 29, 30 and 31—normally rides tangent to the root of the thread 175 and slides along the cam roller shaft 180; however, when the roller contacts the ring 176 or 177 at the outer extremes of the controlling drum 173, the roller rides up the end of the ring—Fig. 30, and causes the trip shaft 181 to be rotated by the lever arms 182, which are secured to both the cam roller shaft 180 and the trip shaft 181. This rotation causes the switch trip lever 183 to rotate—Fig. 28—and contact the adjusting screw 184 on the insulating block 185 which in turn is rotated on its pivot. This action tips the mercury switch 178 breaking the electrical contact and stopping the motor in the motor and gear reduction unit 13—Fig. 2. The spring 186 keeps the mercury switches 178 normally tilted so that contact is maintained, and the spring 187 keeps the switch trip lever 183 vertical except at the extremes of travel. The removable cover 188 permits access to the mercury switches for adjustment and also provides access to the selsyn transmitting motor 189 whose function is to transmit position indication for remote control.

The shaft on the selsyn motor 189—Fig. 26—is pinned directly to the indicator shaft 190, and, consequently, there can be no failure to secure proper relationship with the pointer 191—Fig. 27. The indicator shaft 190 is driven by the arm 192 on which the planetary gear 193 is mounted. Rotation is imparted to the planetary gear 193 through the pinion 194 cut on the end of the control drum hub 195 which is journaled on the trunnion 196. The planetary gear 193 is also in mesh with the internal ring gear 197, which is mounted on the cover and dial plate 198; therefore, rotation of the pinion 194 causes the gear 193 to rotate and travel around the internal ring gear 197 carrying the arm 192 with it.

The accurate control of the gate leaf travel is a simple matter with this control unit, for the total gate travel in inches has a corresponding length of thread on the controlling drum 173 making the adjustment on the controlling drum directly in proportion to the gate leaf travel. Furthermore, these adjustments are readily made by removing the cover plate 199—Figs. 28, 30 and 31 loosening the setscrew 200 in the ring 176 or 177—Figs. 32 and 33—and rotating the rings. A further point in the effective action of this device is the speed with which the cam roller 179 will rise upon contacting the rings 176 or 177 and trip the mercury switches 178.

The principle involved in this switch, obviously, is not limited to the control of the travel of gate leafs, nor do we intend that its use should be restricted to such equipment; for its use could extend to any field where accurate limits of travel need be maintained by a limit switch device. It will be apparent that the principle involved could be extended and that length of the thread on the controlling drum could be increased to represent double or even ten times or more the travel of the controlled element if such accuracy of control were required or desired.

The first alternate construction of the invention is shown on Figs. 35 to 42 inclusive, and the second alternate construction is shown on Figs. 43 to 52 inclusive. These embodiments show several variations of the invention and illustrate the ease with which variations can be made without departing from the spirit of the invention. For the sake of convenience elements of the alternate designs which are similar to the embodiment hereinbefore described will be designated by the same reference numerals.

The first alternate construction embodies: a mechanical method for suspending the gate leaf, independently of the hoist, for both the raised and lowered positions; dual seals on the bulkhead element, as well as the fluidway element of the gate leaf; and a different manner of actuating the seals on the bulkhead element of the gate leaf. These modifications permit withdrawal of either the bulkhead or fluidway element from the encasing housing without reducing the normal operating pressure or draining the conduit or penstock to which the gate structure is attached.

When the gate leaf is in the raised position the dual seals 32—Fig. 39 are forced outward against the seats 34 in the upstream and downstream body members 3 and 4 by fluid pressure behind the seals supplied by the drilled holes 201—Fig. 40. In order to support the fluidway element 1 of the leaf before removing the bulkhead element 2 and the hoisting elements, the covers 202—Figs. 35 and 41—are removed and the pins 203 are screwed into the supporting members 204 on the fluidway element. These pins 203 are carried through the concrete surrounding the gate to openings at the sides through the tubes 205—Fig. 41, which are attached to the housing member 206. The stuffing box 207, packing 208, and gland 209 prevent the escape of fluid between the tube 205 and pin 203. The flanged hub 210 is threaded to receive the threaded portion of the pin 203 and is attached to the housing member 206. The collar 211 at the inner termination of the pin thread actuates the lever 212 allowing it to lower and break the electrical contacts on a switch in the box 213—Figs. 35, 41 and 42—preventing the starting of the hoist motor. The switch is similar in action to the switch illustrated on Figs. 5 and 6. With the fluidway element 1 thus supported the bulkhead element 2 can be removed as indicated in dotted outline on Fig. 37, using the same method of disconnecting the leaf elements hereinbefore described.

When the gate leaf is in the lower position—Fig. 36—the bulkhead seals 32 are actuated by the entrance of fluid from the fluidway into the annular space 31, through the drilled holes 214—Figs. 36, 39 and 40. In this embodiment the poppet valve 15—Fig. 4—has been eliminated; for inasmuch as the gate seals at both the raised and lowered positions, the drain 215—Fig. 36—is always open and produces the necessary unbalance for seating the seals 32.

In removing the fluidway element 1 of the leaf the same procedure is followed as for removing the bulkhead element 2. When the leaf is lowered the supporting members 216—Fig. 41—then coincide with the location of the pins 203 which are screwed into, and support the bulkhead element in the same manner as they do the fluidway element. The fluidway element may then be removed by disjointing the leaf after removing the hoist in a manner hereinbefore described, or the fluidway element can be removed without removing the hoist—Fig. 38. If the latter course is pursued, the manhole cover 217—Figs. 38 and 39—is removed giving access to the interior of the fluidway element 1. Working from the interior of the fluidway—Fig. 41—the cover plate 138 can be removed, the pedestal 137 withdrawn, and the cap nut 135 unscrewed which will allow the fluidway element to be removed without disturbing the hoist, and reassembly can be made in the same manner.

The second alternate construction embodies: a hydraulically operated cylinder in conjunction with a seal ring on the fluidway element of the gate leaf, a flexible means for connecting the actuating chambers of the cylinder with ports in the gate housing, and an external automatic means for actuating the cylinder. The cylinder has a dual function; it seals the fluidway through the leaf with the adjoining fluidway through the body, and it supports the fluidway element while the bulkhead element is removed.

When the gate leaf is in the raised position—Fig. 43—the seal 32 on the fluidway element 1 is forced outward against the seat 34 in the downstream body member 4 by fluid pressure from the fluidway 29 through the drilled holes 218. The cylindrical seal 219—Figs 43 and 44—is likewise forced outward in the opposite direction to 32 by fluid pressure in the annular space 220. The tapered portion 221 on the seal is forced into the mating taper in the seat 222 which is contained in the upstream body member 3. This action in conjunction with the rubber seal 223 renders a fluid-tight seal. In addition, with the cylinder thus extended, it will be apparent that the fluidway element will be supported and that the bulkhead element 2 can be removed in the same manner as already described for the previous embodiments.

Pressure is admitted to the annular space 220 for actuating the cylindrical seal 219, through the port 224—Fig. 43; and pressure is withdrawn from the annular space 225—Figs. 43 and 44—through the port 226. These ports 224 and 226 are in communication with the control valve 227—Figs. 43, 49, 50, and 51—through the passageways 228 and 229—Figs. 43 and 47— and the vertical tube elements 230 and 231 respectively. The extension members 232—Figs. 43 and 48—at the upper termination of the vertical tube elements 230 and 231 have a spherical upper surface 233 which contacts a mating surface on the telescoping elements 234, when the leaf is in the raised position. The telescoping elements 234 are held tightly against the spherical contact surface 233 by the springs 235, and are retained within the downwardly extending sleeves 236 on the spherical shells 237 which in turn are retained by the co-operating spherical bores in the housing 238 and the covers 239. The U-shaped seals 240 prevent the escape of fluid from within the passageways 241 and 242. The spherical contact surface 233 in cooperation with the spherical shells 237, springs 235 and telescoping action provide a positive contact between the ports in the leaf and those in the cover by providing compensation for lateral misalignments as well as variations in vertical travel of the gate leaf.

The passageways 241 and 242 are in communication with the ports 243 and 244, respectively, in the upper bonnet cover 245 to which the control valve 227 is connected. The control valve—Figs. 49, 50, 51 and 52—is essentially a motor-operated four-way valve and consists of the tapered plug 246, with an upwardly extending stem 247 on which is mounted the gear segment 248 which is driven by the pinion 249 on the motor and speed-reducer unit 250. The adjustable trips 251—Figs. 50 and 52—on the gear segment 248 tilt the mercury switch 252 and stop the valve motor. The toggle 253 insures quick and positive action in tipping the mercury switch 252. The cover 254 protects the gearing and serves as a dial for the pointer 255 which is attached to the stem 247 on the tapered plug 246. The plate 256 provides a means for inspecting and adjusting the mercury switch 252.

The cap 257, which is attached to the valve body 258 and contains the packing 259 and the gland 260, prevents the escape of fluid around the stem 247 and retains the tapered plug 246. The tapered plug 246 is held in close contact with its conical seat in the valve body 258 by admitting fluid pressure from the supply line 261 to both the top and bottom of the plug through the drilled holes 262 and 263. The differential in areas will produce a downward force and maintain the tapered plug 246 snugly against its seat in the valve body 258. With the valve in the position shown on Fig 51, pressure from the supply line 261 will enter the passage 264 and be delivered to the port 243 in the upper bonnet cover 245 through the passageway 265. Likewise, fluid from the port 244 in the upper bonnet cover will be exhausted into the drain line 266 through the passageways 267 and 268. Rotation of the gear segment 248 through 90° obviously will reverse the relationship of the supply and drain lines to the ports 243 and 244; and through the interconnecting system previously described, put pressure in the annular space 225—Figs. 43 and 44—and open the annular space 220 to drain. This condition effects the withdrawing of the cylindrical seal 219 into the fluidway element 1; and permits the gate to be raised or lowered while the seal is thus withdrawn.

In order that the cylindrical seal 219 may be positively actuated by pressures in the annular spaces 220 and 225—Fig. 44—a piston ring 269 is inserted in the groove 270 around the periphery; likewise, sealing elements 271 and 272 are inserted in the non-corrodible liners 273 and 274 respectively. The cylindrical cover plate 275 preserves a better stream line through the fluidway and prevents the intrusion of foreign matter into the space 276 behind the cylindrical seal 219. It will be noticed that there is a hole 277 through the plate 275. This hole permits the pressures on the tapered end of the seal to be balanced by pressure on the opposite end of the seal; for when the bulkhead element 2 is removed, there is no pressure in the annular space 220, and, therefore, in order that the seal remain extended it is necessary that no unbalanced hydraulic forces be present on the cylindrical seal. The fact that the annular chambers 220 and 225 are in common communication with the interior of the gate housing except when the leaf is in the fully raised position, prevents movement of the cylindrical seal when the gate leaf is being raised or lowered.

Figures 45 and 46 show a modified method for effecting the sealing of the annular chambers 220 and 225. In this modification a piston ring 279 is inserted in a groove 279 around the periphery of the cylindrical seal 280, and a series of segmental seals 281, which are held in contact with the outer surface of the cylindrical seal by the leaf springs 282, take the place of the seals 271 and 272 of the first embodiment. The segmental seals 281 are encased by non-corrodible liners which are held in place by the ring retainer 283. In all other respects this modification is the same as the one previously described.

The method for actuating the seal 32 on the bulkhead element in this embodiment, when the gate is lowered, is the same as was described for the first embodiment; therefore, the description of this phase will not be duplicated.

From the foregoing description of the several embodiments the flexibility, novelty, and economic value of the invention can readily be appreciated. And whereas in the foregoing description we have described the specific embodiments of the invention for the purpose of satisfying the patent statutes, it is, nevertheless, to be understood that in practicing the same, we may resort to any and all combinations and modifications falling within the scope of the appended claims defining the invention.

We claim—

1. In a gate valve, a gate housing provided with a passageway, a transversely movable articulated gate member comprising separably connected elements within and guided by said housing, each element of said gate member being removable from within said housing while another element is in operative position, means suspending and operating said gate member, and independent means for supporting the operatively-positioned element.

2. In a gate valve, a gate housing provided with a passageway and parallel seating surfaces at opposite sides, an articulated gate member transversely movable between said parallel surfaces within and guided by said housing, one element of said gate member being removable while another is in operative position, hoisting means for operating said gate member, and means for suspending an element of said gate member independently of said hoisting means.

3. In a gate valve, a gate housing provided with a passageway, a transversely movable articulated gate member within and guided by said housing, one element of said gate member being removable while another is in operative position, hoisting means for operating said gate member, and hydraulically actuated piston means movable transversely of gate member movement for suspending an element of said gate member independently of said hoisting means.

4. In a gate valve, a gate housing provided with a passageway, a transversely movable articulated gate member within and guided by said housing, one element of said gate member being removable while another is in operative position and each of said elements having independent roller bearings arranged as chains, hoisting means for operating said gate member, and piston means on one of said elements intermediate said chains for suspending an element of said gate member independently of said hoisting means.

5. In a gate valve, a gate housing provided with a passageway, a transversely movable articulated gate member within and guided by said housing, one element of said gate member being removable while another is in operative position, hoisting means for operating said gate member, means movable relative to said member and housing for suspending an element of said gate member independently of said hoisting means, and means for rendering said operating means inoperative automatically in accordance with the movement of said independent suspending means into operative position.

6. In a gate valve, a gate housing provided with a passageway, a transversely movable articulated gate member within and guided by said housing, one element of said gate member being removable while another is in operative position, hoisting means for operating said gate member, means for suspending an element of said gate member in said operative position independently of said hoisting means, and means responsive to unbalanced hydraulic pressures for sealing at least one of said elements in the operative position including a valve having a pressure connection with said passageway, and means on said gate member for actuating said valve as said element approaches said operative position.

7. In a gate valve, a gate housing provided with a passageway, a transversely movable articulated gate member within and guided by said housing, one element of said gate member being removable while another is in operative position, means suspending and operating said gate member, sealing means for each element, and means responsive to coordinated gate member movement for actuating said sealing means.

8. In a gate valve, a gate housing provided with a passageway, a transversely movable articulated gate member within and guided by said housing, one element of said gate member being removable while another is in operative position, hoisting means for operating said gate member, and means for suspending each element of said gate member in operative position independently of said hoisting means.

9. In a gate valve, a gate housing provided with a passageway, a transversely movable articulated gate member having separable bulkhead and fluidway elements within and guided by said housing, one element of said gate member being removable while another is in operative position, hoisting means for operating said gate member, means for suspending said fluidway element independently of said hoisting means and for sealing said element in the operative position including an annular component of said element axially disposed and advanceable into engagement with said housing, said housing having a recess for receiving said component in the advanced position.

10. In a gate valve, a gate housing provided with a passageway, a transversely movable gate member within and guided by said housing, said gate member comprising bulkhead and fluidway elements, and means forming a separable connection between said elements including a part requiring manipulation for making and breaking said connection disposed interiorly of said member, one element having an opening exposed exteriorly and extending inwardly to said part whereby access to said part is provided from the exterior of said member for manipulation.

11. In a gate valve, a gate housing provided with a passageway, a transversely movable gate member within and guided by said housing, said gate member comprising bulkhead and fluidway elements, means forming a separable connection between said elements including a part requiring manipulation for making and breaking said connection disposed interiorly of said member, said fluidway element having a recess extending from the fluidway to said part whereby access to said part is provided from said fluidway for manipulation, and removable closure means for said recess.

12. In a gate valve, a gate housing provided with a passageway, a transversely movable gate member within and guided by said housing, said gate member comprising bulkhead and fluidway elements, means for suspending and operating said gate member including at least one non-rising stem and tubular means cooperatively engaging said stem, said tubular means having an end portion extended from within one element into the other and means forming a separable connection between said elements including said extended end portion.

13. In a gate valve, a gate housing provided with a passageway, a transversely movable articulated gate member within and guided by said housing, one element of said gate member being removable from within said housing while another is in operative position relative to said passageway, hoisting means for operating said gate member, and means movable transversely of gate member movement for sustaining an element of said gate member in operative position independently of said hoisting means.

14. In a gate valve, a gate housing provided with a passageway, a gate member within said housing movable transversely of said passageway, said gate member comprising separably connected elements one of which is removable from within said housing independently of another, hoisting means for operating said gate member, independent means for sustaining said other element in a predetermined position relative to said passageway while the one element is being removed, and means responsive to gate member movement for rendering said independent sustaining means inoperative except when said other element is in said predetermined position.

15. In a gate valve, a gate housing provided with a passageway, a transversely movable gate member within and guided by said housing, said gate member comprising connected bulkhead and fluidway components, a pressure-responsive sealing element movable relative to said member and housing for sealing said fluidway component in operative position, means for moving said element into sealing position including means for subjecting said element to pressure of fluid passing through said fluidway, and means responsive to gate member movement for relieving back pressure on said sealing element tending to oppose such movement only when said fluidway component is in said operative position.

16. In a gate valve, a gate housing provided with a passageway, a gate member within said housing movable transversely of said passageway, a pressure-responsive sealing element movable relative to said member and housing for sealing said gate member in operative position, and means for moving said element into sealing position including means responsive to gate member movement for subjecting said element to pressure of the controlled fluid only when said gate member is in said operative position.

17. In a gate valve, a gate housing provided with a passageway, a transversely movable articulated gate member within and guided by said housing, one element of said gate member being removable from within said housing while another is in operative position relative to said passageway, hoisting means for operating said gate member, and fluid operated means movable transversely of gate member movement for sustaining an element of said gate member in operative position independently of said hoisting means.

18. In fluid control apparatus, relatively movable parts forming respectively a fluid flow orifice and a gate member movable transversely thereof, a pressure-responsive sealing element movable axially of said orifice for sealing said gate member in operative position, and means for moving said element into sealing position including means responsive to gate member movement for subjecting said element to unbalanced fluid pressures of which the higher pressure is substantially the pressure of the controlled fluid only when said gate member is in said operative position.

19. In fluid control apparatus, relatively movable parts forming respectively a fluid flow orifice and a gate member movable transversely thereof, a pressure-responsive sealing element movable axially of said orifice for sealing said gate member in operative position, means for moving said element into sealing position comprising means including a valve actuated in response to movement of said gate member into said operative position for subjecting said element to unbalanced fluid pressures of which the higher pressure is substantially the pressure of the controlled fluid.

20. In apparatus for controlling the flow of fluid, a stationary structure providing a fluid flow passage, a movable structure constituting a gate movable with respect to said stationary structure for opening and closing said passage, sealing means responsive to fluid pressure for sealing the joint between said structures, and control means responsive to movement of said gate for admitting fluid under pressure to said sealing means and operable to seal said joint only upon movement of said gate into the closed position relative to said passage.

PHILLIP A. KINZIE.
GROVER J. HORNSBY.